C. C. FIFIELD.
FILTER FOR CISTERNS.
APPLICATION FILED JUNE 4, 1909.
950,018.
Patented Feb. 22, 1910.
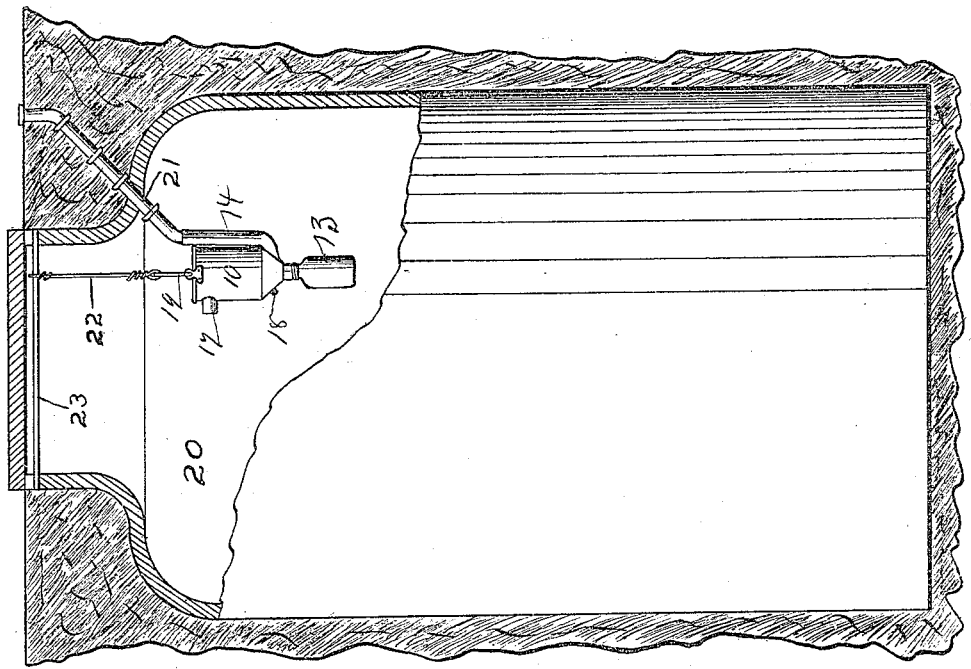
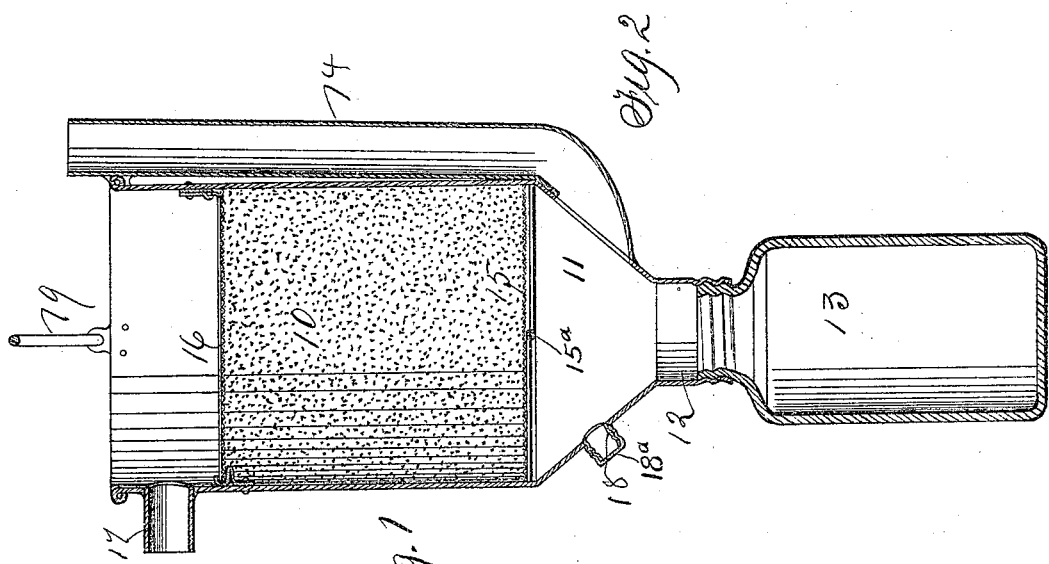

UNITED STATES PATENT OFFICE.

CHESTER C. FIFIELD, OF GRAND JUNCTION, IOWA.

FILTER FOR CISTERNS.

950,018.  Specification of Letters Patent.  Patented Feb. 22, 1910.

Application filed June 4, 1909. Serial No. 500,785.

*To all whom it may concern:*

Be it known that I, CHESTER C. FIFIELD, a citizen of the United States, residing at Grand Junction, in the county of Greene and State of Iowa, have invented a new and useful Filter for Cisterns, of which the following is a specification.

The object of this invention is to provide an improved construction for removable and replaceable cistern filters.

A further object of this invention is to provide improved means for emptying and charging a filter with filtering material, such as charcoal.

My invention consists in the construction, arrangement and combination of elements hereinafter set forth, pointed out in my claims and illustrated by the accompanying drawing, in which—

Figure 1 is a vertical section of the filter detached from a cistern. Fig. 2 is an elevation, partly in section, showing my improved filter mounted in a cistern.

In the construction of the filter as shown the numeral 10 designates a vessel, preferably open at its top, circular in cross-section, and formed with a funnel-shaped bottom 11 terminating in an open neck 12 interiorly threaded. A jar or container 13, preferably formed of glass and having a restricted open neck exteriorly threaded, is screwed into the open neck 12 of the vessel 10. A pipe 14 is arranged outside of and fixed to the vessel 10 and extends longitudinally thereof. The lower end portion of the pipe 14 is bent inwardly and communicates through an opening in and is sealed to the funnel portion 11 of the vessel 10. A circular screen 15 is mounted in and extends across the vessel 10 and is supported loosely on a spider 15$^a$ formed of crossed rods loosely mounted in the vessel and resting on the funnel-shaped portion 11 thereof. A circular screen 16 is mounted loosely, removably and replaceably in and extends across the vessel 10 and is spaced from the screen 15. The space between the screens 15, 16 is adapted to be filled with filtering material, such as comminuted charcoal. A discharge pipe 17 is mounted in and extends laterally from an opening in the vessel 10 above the screen 16 and said pipe is sealed to said vessel. A relief pipe 18 is mounted in and extends obliquely downward from an opening in the funnel-shaped portion 11 and is sealed to said portion. The relief pipe 18 normally is closed by a screw cap 18$^a$. A bail 19 is hinged in a common manner to and arches across the open upper end of the vessel 10.

In practical use the parts are assembled as shown in Fig. 1 and then mounted in a cistern 20 as shown in Fig. 2. When so mounted the pipe 14 receives and communicates with a service pipe 21 at its upper end and the bail 19 is supported by a hanger 22 to a cross bar 23 mounted transversely of the neck of the cistern 20. Water is conveyed through the pipe 21 from a source of supply such as the rain water pipes and spouts of a building, and is conveyed by the pipe 14 to the funnel 11. Sediment, such as gravel, leaves and trash settles by gravity from the funnel 11 into the jar or container 13. The water rises through the screen 15, filter material, and screen 16 and flows out of the vessel 10 into the cistern 20 through the pipe 17.

The device can be removed from the cistern by manipulation of the hanger 22, which is first detached from the bar 23 and lowered to release the pipe 14 from the pipe 21 and then is lifted intact out of the cistern. When the filter has been removed from the cistern the cap 18$^a$ may be unscrewed and the water emptied from the filter through the relief pipe 18. Then the jar or container 13 may be unscrewed and emptied and cleansed. Then the screen 16 may be removed from the filter and the filtering material may be removed and thrown away or cleansed. At the same time the screen 15 and spider 15$^a$ may be removed and cleansed and the funnel 11 may be cleansed. Then the spider 15$^a$ and screen 15 may be replaced, new or clean filtering material may be placed on the screen, the screen 16 be replaced, the cap 18$^a$ be replaced, the jar 13 be replaced, and then the entire device be suspended again in the cistern 20 as shown in Fig. 2.

An examination of the jar 13 may be made, without removing the device from the cistern, for the purpose of determining the quantity of sediment contained therein, because of the transparent characteristic of said jar. Thus the jar may be employed as an index of the time for cleansing the filter or changing the filtering material therein.

I claim as my invention—

1. A filter adapted to be suspended in and removable and replaceable relative to a cistern having a supply pipe, which filter consists of a vessel open at its top, a bail hinged to the open top of the vessel, a hanger engaging said bail, a support engaging said hanger and adapted to be carried by the cistern, an entrance pipe communicating with the lower portion of said vessel and adapted to communicate with the supply pipe of the cistern and telescope thereon, a spider transversely of the lower portion of said vessel above the lower end of said entrance pipe, a screen loosely mounted on said spider, a screen supported within and transversely of the vessel above and spaced from the first screen, a discharge pipe leading laterally from the vessel above the upper screen, a relief pipe communicating with the lower portion of the vessel, and a sediment jar screwed to and depending axially of said vessel.

2. A filter adapted to be suspended in and removable and replaceable relative to a cistern having a supply pipe, which filter consists of a vessel open at its top, said vessel formed with a funnel-shaped lower end portion, a bail hinged to the open top of the vessel, a hanger engaging said bail, a support engaging said hanger and adapted to be carried by the cistern, an entrance pipe communicating with the lower portion of said vessel and adapted to communicate with the supply pipe of the cistern and loosely telescope thereon, a spider transversely of the lower portion of said vessel above the lower end of said entrance pipe and supported by said funnel-shaped portion of the vessel, a screen loosely mounted on said spider, a screen supported within and transversely of the vessel above and spaced from the first screen, a discharge pipe leading laterally from the vessel above the upper screen, a relief pipe communicating with the lower portion of the vessel, and a sediment jar screwed to and depending axially of said vessel.

CHESTER C. FIFIELD.

Witnesses:
W. H. ADAMS,
LUELLA WELSCH.